United States Patent [19]

Grosse et al.

[11] 3,890,180

[45] June 17, 1975

[54] COATED PAPER

[75] Inventors: Ludwig Grosse, Taunusstein; Hans Werner Dorr, Niederwalluf, both of Germany

[73] Assignee: Hoechst Aktiengesellschaft, Germany

[22] Filed: Dec. 21, 1973

[21] Appl. No.: 427,222

[30] Foreign Application Priority Data

Dec. 27, 1972 Germany.............................. 2263450

[52] U.S. Cl....... 156/71; 117/155 UA; 117/161 UN; 156/289; 260/29.6 SQ; 260/30.8 R
[51] Int. Cl.............................................. E04f 13/00
[58] Field of Search.............260/29.6 SQ, 29.6 MQ, 260/30.8 R, 29.6 PM; 156/71, 289; 117/161 P, 161 UN, 155 R

[56] References Cited
UNITED STATES PATENTS 3,689,448  9/1972  Berger et al................ 260/29.6 MQ

FOREIGN PATENTS OR APPLICATIONS 1,235,186  6/1971  United Kingdom

*Primary Examiner*—Edward G. Whitby
*Attorney, Agent, or Firm*—James E. Bryan

[57] ABSTRACT

This invention relates to a process for releasably covering a tacky or adhesive layer carried by an article which comprises covering the layer with a coated side of a one-side coated paper formed by application to paper of an aqueous dispersion, free from emulsifying agent, of a copolymer of ethylene and from 0.1 to 30 per cent, based on the weight of the solids content of the dispersion, of an alkali metal salt of a compound of the formula $R_1CH_3C(R_2)CONH-SO_3H$ wherein $R_1$ and $R_2$ are hydrogen or an organic radical containing 1 to 10 carbon atoms.

5 Claims, No Drawings

COATED PAPER

This invention relates to release papers and to underlay papers which may be applied to walls before normal wallpaper is applied.

German Offenlegungsschrift No. 1,720,667, (British Pat. No. 1,235,186) discloses a process for the production of dispersions of copolymers of ethylene by copolymerization of ethylene with ethylenically-unsaturated compounds at pressures of 50–2,500 atmospheres and temperatures of 50° to 250° C in the presence of free radical initiators, if desired in the presence of further polymerizable ethylenically-unsaturated compounds and in the absence of emulsifying agents. In this process there is used, as an ethylenically-unsaturated compound, an alkali metal salt of an unsaturated acyl amide-N-sulfonic acid of the formula $R_1CH=C(R_2)CONH-SO_3H$, wherein each of $R_1$ and $R_2$ is independently selected from hydrogen or an organic radical with 1 to 10 carbon atoms. Alkali metal is present in quantities of 0.1 to 30 per cent by weight calculated on the solids content of the dispersions. The other compounds if used are preferably employed in quantities of less than 50 per cent by weight based on the solids content of the dispersions.

The dispersions obtained in accordance with the above-mentioned process may be used to coat plastics, wood, paper, leather and other materials and to impregnate or finish paper, felt and fibrous materials. On drying, they leave on the substrates a non-adhesive, highly polished clear coating which is relatively insensitive to water and is practically insoluble in most common solvents.

The present invention provides a process for releasably covering a tacky or adhesive layer carried by an article in which the layer is covered with the coated side of a coated paper formed by the application to paper of an aqueous dispersion, free from emulsifying agent, of a copolymer of ethylene and from 0.1 to 30 per cent (based on the weight of the solids content of the dispersion) of an alkali metal salt of a compound of the formula $R_1CH_3C(R_2)CONH-SO_3H$ wherein $R_1$ and $R_2$, which may be the same or different, are hydrogen or an organic radical containing 1 to 10 carbon atoms, and optionally one or more other copolymerizable ethylenically-unsaturated compounds. Generally speaking, in the process of the invention, the coated paper is used as a release paper. In an embodiment of the process, which is of great practical interest the coated paper is pasted with its uncoated side on a wall and is covered on its coated side with the adhesive coating of a wallpaper pasted on the coated side of the coated paper. In this embodiment of the process the coated paper is a release paper which is used as a substrate under wallpaper on the walls of buildings. For the production of release paper, raw paper is coated, normally without previously surface-sizing, with an aqueous copolymer dispersion of 15 to 50 per cent by weight solids content. Generally, an application of 8 to 12 g. per sq. m. is sufficient to obtain the desired separating effect. Calcium stearate and/or waxes soluble or emulsifiable in water may, if desired, be added to the dispersion, preferably in quantities of up to 30 per cent by weight based on the aqueous dispersion.

Preferably the dispersion contains a copolymer derived from the dipotassium salt of methacrylic acid-amide-N-sulfonic acid. The alkali salt of the acylamide-N-sulfonic acid is preferably present in the dispersion in a quantity of 1 to 7 per cent by weight, based on the solids content. As a further component, the copolymer may contain, e.g. an acrylic acid ester; such copolymers are especially suitable in the production of release paper. The acrylic acid ester may constitute up to 75 per cent by weight of the polymer, e.g. 60 per cent by weight.

In practical application, release papers which have proved very useful are those in which the copolymer layers are produced from dispersions as described in Example 9 of the above-mentioned specifications.

The use in accordance with the invention of paper coated with the copolymer is in particular suitable for covering adhesive layers of sticky labels and for pasting interior wall surfaces.

In the last-mentioned use, subsequently pasted-on wallpaper can be removed completely after a considerable period, and replaced by a new wallpaper without further treatment.

It will be obvious to those skilled in the art that many modifications may be made within the scope of the present invention without departing from the spirit thereof, and the invention includes all such modifications.

What is claimed is:

1. A process for releasably covering a tacky or adhesive layer carried by an article which comprises covering the layer with the coated side of a one-side coated paper formed by application to paper of an aqueous dispersion, free from emulysifying agent, of a copolymer of
   a. 18 to 99 per cent by weight of ethylene,
   b. 1 to 7 per cent by weight of an alkali metal salt of a compound of the formula $R_1CH_3C(R_2)CONH-SO_3H$ wherein $R_1$ and $R_2$ are hydrogen or a hydrocarbon group containing 1 to 10 carbon atoms, and
   c. 0 to 75 per cent by weight of an $\alpha,\beta$-unsaturated acid ester containing 4 to 10 carbon atoms, copolymerized at a pressure in the range of 50 to 2,500 atmospheres and at a temperature in the range of 50° to 250° C, in the presence of a free radical initiator.

2. A process as claimed in claim 1 in which component b) of the copolymer is the dipotassium salt of methacrylic acid-amide-N-sulfonic acid.

3. A process as claimed in claim 1 in which component b) of the copolymer is the dipotassium salt of methacrylic acid-amide-N-sulfonic acid, and component c) of the copolymer is methyl methacrylate.

4. A process as claimed in claim 1 wherein the dispersion contains up to 30 per cent by weight of calcium stearate.

5. A process as claimed in claim 1 wherein the dispersion contains up to 30 per cent by weight of wax.

* * * * *